(No Model.)
J. H. BLESSING.
WATER PURIFYING APPARATUS.
No. 379,673. Patented Mar. 20, 1888.
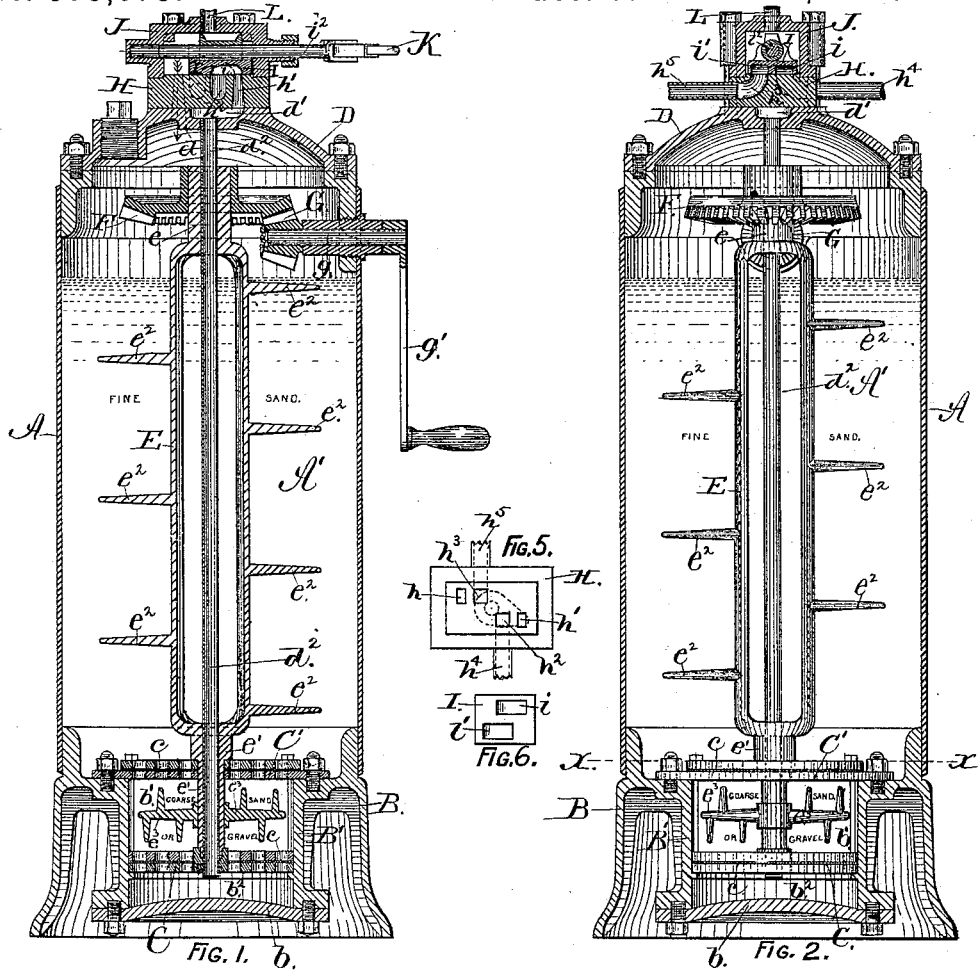
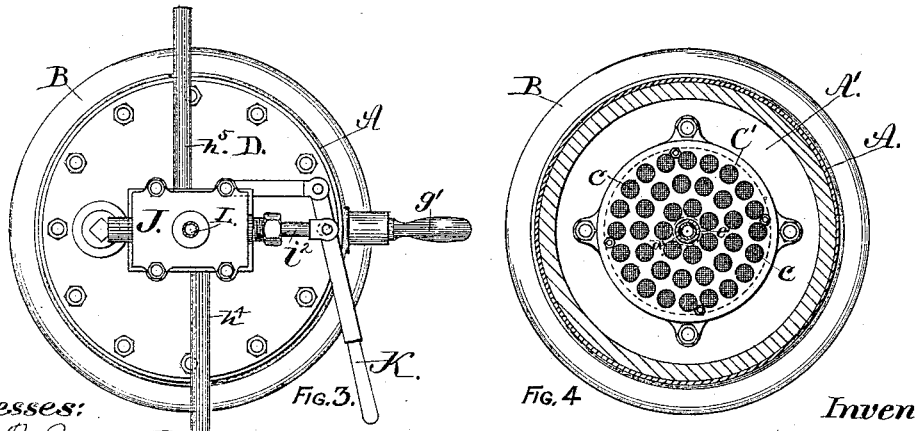
Witnesses:
S. B. Brewer
Geo. Hamlin
Inventor:
JAMES H. BLESSING,
by William N. Low,
Attorney.

UNITED STATES PATENT OFFICE.

JAMES H. BLESSING, OF ALBANY, NEW YORK.

WATER-PURIFYING APPARATUS.

SPECIFICATION forming part of Letters Patent No. 379,673, dated March 20, 1888.

Application filed January 3, 1886. Serial No. 223,231. (No model.)

*To all whom it may concern:*

Be it known that I, JAMES H. BLESSING, of the city and county of Albany, in the State of New York, have invented new and useful Improvements in Water-Purifying Apparatus, of which the following is a specification.

My invention relates to improvements in water-purifying apparatus in which the filtering material is cleansed by reversing the direction in which the currents of water pass through the filtering-chamber, and in which the operation of cleansing said filtering material is aided by disturbing and stirring up said material by means of mechanical agitators; and the objects of my improvement are to provide an effectual sand or gravel screen for preventing the filtering material from being carried out of the filtering-chamber, the said sand screen being located in a chamber directly beneath the filtering-chamber provided with a revoluble agitator for mechanically stirring up the sand or gravel of which the said sand screen is composed, and to provide a reliable apparatus for purifying water and other liquids. I attain these objects by means of the mechanism illustrated in the accompanying drawings, which are herein referred to and form part of this specification, and in which—

Figure 1 is a vertical section of my apparatus through the center line thereof; Fig. 2, a vertical section taken at right angles to Fig. 1, with internal parts in the filtering-chamber shown in elevation; Fig. 3, a plan view of my apparatus; Fig. 4, a horizontal section at the line $xx$ of Fig. 2; Fig. 5, a detached plan view of the valve-seat, and Fig. 6 an inverted detached plan view of the current-reversing valve.

As represented in the drawings, A is the cylindrical casing of the filtering-chamber A'. Said casing is secured to the base-piece B, which is provided with a central inner cylinder, B', whose lower end is closed by a removable head, $b$. A perforated partition, C, is fixed near the bottom of the inner cylinder, B', and a like partition, C', closes over the top of said chamber for the purpose of forming the gravel-chamber $b'$ between said partitions and the filtered-water chamber $b^2$, beneath the lower partition. Wire-gauze or finely-perforated sheet metal $c$ is fixed across the openings of the partitions C and C', and the chamber $b'$ is filled with gravel or coarse sand whose grains are sufficiently large to prevent them from passing through the meshes of the wire-gauze screens $c$. The grains of gravel or coarse sand contained in the chamber $b'$ constitute a sand-screen which prevents the particles of filtering material contained in the chamber A' from passing through the chamber $b'$ and into the filtered-water chamber $b^2$.

A bonnet, D, is fitted to close the top of the casing A. Said bonnet is provided with a port, $d$, (shown in dotted lines in Fig. 1,) which leads directly into the chamber A'. A passage, $d'$, is also made in the top of said bonnet, and from said passage a pipe or stationary hollow shaft, $d^2$, is carried down centrally through the chambers A' and $b'$ into the filtered-water chamber $b^2$.

The filtering-chamber A' is nearly filled with a suitable filtering material, which preferably consists of a moderately-fine beach-sand. A skeleton shaft or frame, E, which terminates in a sleeve, $e$, at its upper end, and at its lower end in a sleeve, $e'$, that passes through the upper partition, C', and into the chamber $b'$, is fitted to rotate on the stationary hollow shaft $d^2$. Said skeleton shaft is provided with a series of radial arms, $e^2$, which, when the shaft E is rotated, serve as agitators for disturbing the particles of filtering material in the filtering-chamber A', and the arms $e^3$, attached to the lower part of said shaft, perform the same function upon the gravel in the chamber $b'$. A gear-wheel, F, secured to the upper part of the shaft E, engages with a pinion, G, which is fixed to a shaft, $g$. The latter is provided at the outside of the casing A with a hand-crank, $g'$, which affords the means of imparting the requisite rotatory motion to the shaft E.

The valve-seat H, secured to the top of the bonnet D, is provided with two induction-ports, $h$ and $h'$, the first of which communicates with the port $d$, (leading directly into the filtering-chamber A',) and the other communicates through the passage $d'$ with the pipe $d^2$, that leads directly into the filtered-water chamber $b^2$. Said valve-seat is also provided with two eduction-ports, $h^2$ and $h^3$, the first of which communicates with the discharge-pipe $h^4$, by which the filtered water is conveyed to the required points, and the port $h^3$ communicates with the waste-water pipe $h^5$, by which the waste water, contaminated by cleansing the filtering material, is conveyed to a drain or other outlet. The two induction-ports are located at opposite ends of the valve-seat H, with the induction-port $h$ and eduction-port $h^3$ formed at one side of the longitudinal center line of said valve-seat and the induction-port $h'$ and eduction-port $h^2$ at the opposite side of said center line.

The valve I is fitted to slide on the valve-seat H, and is provided with two independent pass-over passages, $i$ and $i'$, the first of which, when the valve is moved in one direction, will form a communication between the induction-port $h'$ and eduction-port $h^2$, and the other (when the valve is moved in an opposite direction) will form a communication between the induction-port $h$ and eduction-port $h^3$; but in any position in which said valve is placed it will cover both of said eduction-ports. The valve-chest J is fixed on the valve-seat H and incloses the valve I. The valve-stem $i^2$, which is attached to the valve I, connects the latter with the hand-lever K, and by said lever the valve I can be operated, as occasion may require.

A supply-pipe, L, conducts the water from the source of supply into the valve-chest J, and from thence the water flows through one of the induction-ports (either $h$ or $h'$) into the filtering-chamber A'.

The operation of my apparatus is as follows: To filter the water the valve I is moved to the position shown in Fig. 1, where its pass-over passage $i$ will form a communication between the induction-port $h'$ and eduction-port $h^2$. The induction-port $h$ will then be open to permit the water entering through the supply-pipe to pass directly into the filtering-chamber A', in which, by passing downwardly through the filtering material, the impurities that are held in suspension by the water will be deposited in and retained by said filtering material, and the purified water, after passing downward through the gravel in the chamber $b'$, enters the filtered-water chamber $b^2$, and from thence passes upward through the central pipe, $d^2$, passage $d'$, induction-port $h'$, pass-over passage $i$, and eduction-port $h^2$, and thence passes out through the discharge-pipe $h^4$ to the place where it is to be delivered. This action continues until the interstices between the particles of the filtering material become so filled and clogged by the impurities defecated from the water that the flow of the water through the apparatus will become checked. The process of filtration should then be stopped and the operation of cleansing the filtering material begun. This latter operation is effected by moving the valve I to the opposite end of the valve-seat H, thereby closing the induction-port $h$ and opening the induction-port $h'$. Thereupon the water will pass down through the induction-port $h'$, passage $d'$, central pipe, $d^2$, into the filtered-water chamber $b^2$. From thence the water passes up through the gravel in the chamber $b'$, carrying with it any of the filtering material from the chamber A' that may have been caught and retained by the gravel in the chamber $b'$, and, thence passing upward through the filtering material in the chamber A', it washes out the impurities deposited in said filtering material. The said impurities are carried upward by the current of water through the induction-port $h$, pass-over passage $i'$, and eduction-port $h^3$ into the waste-water pipe $h^5$. During the process of filtration the filtering material in the chamber A becomes impacted so densely that the shaft E cannot be rotated; but as soon as the direction of the current of water is reversed (to cleanse the filtering material) the particles of the latter become loosened and separated, so as to permit said shaft to be revolved freely, and the radial arms $e^2$ on said shaft will agitate and disturb the particles of said filtering material to such a degree that the impurities deposited therein can be readily carried away by the water-currents. The arms $e^3$ in the chamber $b'$ will during the rotation of the shaft E agitate the gravel in the chamber $b'$, so as to liberate any particles of the filtering material held therein, and the water-currents will return said particles to their place in the chamber A'.

I claim as my invention—

1. In a filtering apparatus, the combination, with a sand-screen composed of gravel contained in a chamber that underlies the filtering-chamber, of a revoluble agitator arranged within the said sand-screen, to operate as and for the purpose herein specified.

2. In a filtering apparatus, the combination, with a filtering-chamber, A', which contains the filtering material whereby the suspended impurities are removed from the water, a sand-screen contained in the chamber $b'$, which separates the said filtering-chamber from the filtered-water chamber $b^2$, a valve-seat, H, having two oppositely-located induction-ports, one leading directly into the filtering-chamber A' and the other communicating through the central pipe, $d^2$, with the filtered-water chamber $b^2$, the said valve-seat also having two eduction-ports, one leading into the filtered-water discharge-pipe and the other leading into the waste-water outlet, and a slide valve fitted to reciprocally open and close said ports, of a revoluble agitator fitted to rotate on the central pipe, $d^2$, and provided within the filtering-chamber A' and sand-screen chamber $b'$ with radial arms $e^2$ and $e^3$, arranged to operate as and for the purpose herein specified.

JAMES H. BLESSING.

Witnesses:
JOHN W. WHEELOCK,
WM. H. LOW.